United States Patent
Bonito

(10) Patent No.: US 9,697,540 B2
(45) Date of Patent: Jul. 4, 2017

(54) GOLF SCORING, MARKETING, AND REPORTING SYSTEM AND METHOD OF OPERATION

(71) Applicant: Apple Electric Car, Inc., Fort Lauderdale, FL (US)

(72) Inventor: Anthony P. Bonito, Davie, FL (US)

(73) Assignee: Apple Electric Car, Inc., Fort Lauderdale, FL (US)

( * ) Notice: Subject to any disclaimer, the term of this patent is extended or adjusted under 35 U.S.C. 154(b) by 0 days.

(21) Appl. No.: 14/245,755

(22) Filed: Apr. 4, 2014

(65) Prior Publication Data

US 2015/0039394 A1    Feb. 5, 2015

Related U.S. Application Data

(63) Continuation of application No. 13/706,855, filed on Dec. 6, 2012, now abandoned.

(51) Int. Cl.
| | |
|---|---|
| *A63B 71/06* | (2006.01) |
| *G06Q 30/02* | (2012.01) |
| *A63B 24/00* | (2006.01) |
| *G06Q 20/18* | (2012.01) |
| *A63B 102/32* | (2015.01) |

(52) U.S. Cl.
CPC ..... *G06Q 30/0267* (2013.01); *A63B 24/0084* (2013.01); *A63B 71/06* (2013.01); *A63B 71/0669* (2013.01); *G06Q 20/18* (2013.01); *G06Q 30/0204* (2013.01); *A63B 2071/0694* (2013.01); *A63B 2102/32* (2015.10); *A63B 2225/20* (2013.01)

(58) Field of Classification Search
CPC .......................... A63B 71/06; A63B 71/0669
See application file for complete search history.

(56) References Cited

U.S. PATENT DOCUMENTS

| | | | | |
|---|---|---|---|---|
| 5,795,237 | A * | 8/1998 | Miyamoto | A63B 71/06 473/131 |
| 5,949,679 | A * | 9/1999 | Born et al. | 700/91 |
| 6,062,991 | A * | 5/2000 | Moriarty et al. | 473/407 |
| 6,705,942 | B1 * | 3/2004 | Crook et al. | 463/3 |
| 2002/0053078 | A1 * | 5/2002 | Holtz et al. | 725/14 |

(Continued)

*Primary Examiner* — James S McClellan
*Assistant Examiner* — Kevin Carter
(74) *Attorney, Agent, or Firm* — Malloy & Malloy, P.L.

(57) ABSTRACT

A system and method automatically report electronically recorded golf scores and other information to a golfer during or upon completion of a round of golf. A golfer operates a mobile terminal during play of a round of golf. The mobile terminal displays at least an electronic score card on its display. The mobile terminal may optionally display other information, such as advertisements, that may be of interest to the golfer. During play, the mobile terminal receives inputs from the golfer to record the golfer's scores. Other inputs may include selection of a displayed advertisement or purchase of a displayed product or service. Once the scores have been entered, the mobile terminal wirelessly transmits the scores and/or other information to a central server via a wireless subsystem. The scores and/or other information are then automatically communicated from the server to an email account and/or personal web portal account of the golfer.

29 Claims, 3 Drawing Sheets

(56) References Cited

U.S. PATENT DOCUMENTS

| | | | | |
|---|---|---|---|---|
| 2003/0149938 A1* | 8/2003 | McElfresh | ............. | G06Q 30/02 |
| | | | | 715/251 |
| 2003/0163541 A1* | 8/2003 | Austin | .................... | A63F 13/12 |
| | | | | 709/207 |
| 2004/0026493 A1* | 2/2004 | Constantine | ................... | 235/375 |
| 2004/0073325 A1* | 4/2004 | Reeves | ............. | A63B 71/0669 |
| | | | | 700/91 |
| 2004/0147329 A1* | 7/2004 | Meadows | .............. | A63B 57/00 |
| | | | | 473/131 |
| 2004/0196181 A1* | 10/2004 | Huston | ................... | G01S 19/19 |
| | | | | 342/357.25 |
| 2006/0107204 A1* | 5/2006 | Epstein | ......................... | 715/517 |

* cited by examiner

GOLF SCORING, MARKETING, AND REPORTING SYSTEM AND METHOD OF OPERATION

CROSS REFERENCE TO RELATED APPLICATIONS

This application is a continuation of U.S. application Ser. No. 13/706,855 filed on Dec. 6, 2012, which application is incorporated in its entirety herein by this reference. U.S. application Ser. No. 13/706,855 is a continuation of U.S. application Ser. No. 13/111,672 filed on May 19, 2011, abandoned, which application is also incorporated in its entirety herein by this reference. U.S. application Ser. No. 13/111,672 is a continuation of U.S. application Ser. No. 11/877,468 filed on Oct. 23, 2007, abandoned, which application is also incorporated in its entirety herein by this reference. Finally, U.S. application Ser. No. 11/877,468 claims priority under 35 U.S.C. §119(e)(1) upon U.S. Application Ser. No. 60/856,103, filed Nov. 3, 2006, which application is also incorporated in its entirety herein by this reference.

BACKGROUND OF THE INVENTION

Field of the Invention

The present invention relates generally to systems in which golfers keep their scores using a mobile or portable computing device that is handheld or integrated into or attached to a golf car and/or which provides advertisements to golfers through such computing device. More particularly, the present invention relates to a comprehensive golf scoring, marketing and reporting system and method in which golf scores and/or other information (e.g., information pertaining to selected advertisements) are automatically reported and/or communicated to a golfer upon completion of or during a round of golf.

Description of Related Art

Systems that employ computers on a golf car are well known. The first such system to employ the use of a computer, with a monitor or screen, on a golf car is disclosed in U.S. Pat. No. 5,095,430 ("the '430 Patent") issued to Bonito, et al. In accordance with that system, golfers record their scores during play using the computer and then store their scores on a removable memory device, such as a floppy disk, CD-ROM, "JUMPDRIVE", memory stick or other portable memory device, installed in the computer. The portable storage device can then be removed and transferred to the golfer's own personal computer. Additionally, the system disclosed in the '430 Patent provides the golfer information relating to hole location and distance using the Global Positioning Satellite (GPS) system, triangulation or other known distance determining algorithms.

Other computer-based golf car systems provide advertising to golfers during play. One such system is disclosed in U.S. Patent Application Publication No. US 2005/0228547 A1. This publication describes a GPS system for use by golfers in their golf cars. The system supplies useful yardage information to the golfer without the need for frequent manual maintenance by the golf course. The system also includes an advertising medium for reaching golfers at the golf course. The publication further discloses a business method related to providing the GPS system to golf courses to benefit those courses by permitting them to obtain the system at no cost and potentially at a financial gain, and also permits them to obtain updated and improved golf cars at a substantial discount. Golf courses also benefit because of faster resultant play by golfers on the course, thus permitting the course operators to consider offering more tee times.

Another computer-based golf car system is disclosed in U.S. Pat. No. 5,689,431. This patent discloses a player position determining and course management system employing GPS antennas/receivers, computers and monitors mounted to golf cars (or handheld units). The system includes a variety of features, including (i) display of golf course and hole features on the monitor; (ii) determination and display of the position location of golf cars in real time, displayed both in the golf car and at a central location (e.g., clubhouse); (iii) transmission and reception of information between a base station and the golf cars; (iv) a method for mapping the perimeter of the holes and of features within the holes (e.g., greens and hazards); (v) use of error correction to correct errors in the actual GPS coordinates received from GPS satellites; (vi) determination of distance from a ball/car location to the green, the pin or any other location on the hole; (vii) the monitoring of the pace of play; (vii) advertising on the golf car monitor with revenue enhancement to the golf course; (ix) tracking of each shot on a map of the course; (x) use of repeaters with directional antennas to overcome obstacles/topography; (xi) advertising on the golf car monitor triggered by entry into a "survey zone" (e.g., an area around the green or tee box) by the golf car; and (xii) furnishing of a golfer's stats for a round to the golfer in hard copy or on disc (e.g., manually or automatically as player drives car away from $18^{th}$ green (i.e., out of the $18^{th}$ green's "survey zone")).

A further computer-based golf car system is disclosed in U.S. Pat. No. 5,364,093. This patent is directed to a system and method for determining the approximate distance between a golf ball and a golf hole on the green using GPS. The system employs monitors on each golf car, which display an image of the golf hole being played and show the locations of the golf car on the hole, the cup on the green, and the distance between the golf car and the cup. The position of the golf car is error corrected to account for data degradation and other inaccuracies present within the GPS data transmissions.

A further computer-based golf car system is disclosed in U.S. Patent Application Publication No. US 2004/0196181 A1. This publication discloses a method, apparatus and system for displaying messages to golfers on a golf course, including advertising messages. The system employs GPS receivers associated with each golf car (or handheld unit), as well as showing distance to pin or other features on the golf hole.

Another computer-based golf car system is disclosed in U.S. Pat. No. 5,810,680. This patent is directed to a system and apparatus for tracking location and distance on a golf course, recording golfer performance statistics, receiving notification via a pager, and playing infomercials during the course of a golf game. The apparatus includes a touch screen display. The infomercials are provided to entertain and educate the golfers, while generating supplemental advertising revenue for the course operators.

While the foregoing systems provide a variety of independent and integrated features associated with a game of golf, none of the aforementioned systems provide an automatic reporting mechanism to provide the golfer feedback relating to his round of golf, without requiring the golfer to physically transfer the information by carrying a portable memory device or other tangible item (e.g., a piece of paper bearing the golf scores). Further, none of the prior art systems include electronic submission of golf scores in accordance with U.S. Golf Association (USGA) rules, which require the attestation of a player's score by another player in the group. Still further, none of the prior art systems provide a password-accessible portal for use by golfers at which the golfers can retrieve information pertaining to various rounds of golf played at courses employing mobile computer generated scoring and advertising, as well as optionally select for presentation and otherwise customize the arrangement of certain information on the mobile golf car display. Still further, none of the prior art systems provide automatic email reporting of electronically generated golf scores, as well as optionally supplying information related to advertisements or other information for which the golfer has, or has shown, interest.

DETAILED DESCRIPTION OF EXEMPLARY EMBODIMENT(S)

Figure 1:
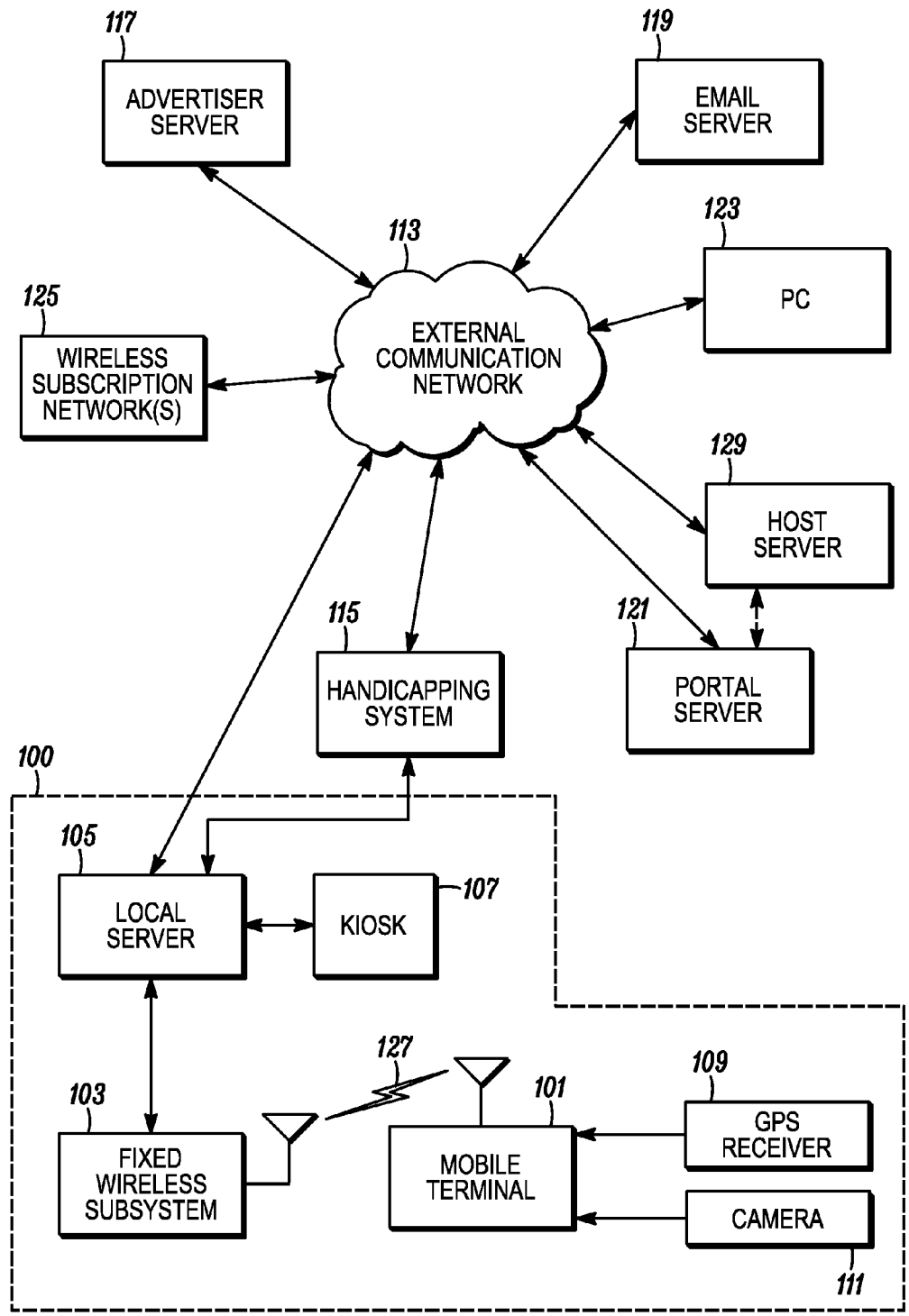
FIG. 1 is a block diagram of a scoring, reporting and marketing system in accordance with one exemplary embodiment of the present invention.

Before describing in detail exemplary embodiments that are in accordance with the present invention, it should be observed that the embodiments reside primarily in combinations of apparatus components and processing steps related to implementing a golf scoring, marketing and reporting system and method. Accordingly, the apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms, such as "first" and "second," "top" and "bottom," and the like, may be used solely to distinguish one entity or element from another entity or element without necessarily requiring or implying any physical or logical relationship or order between such entities or elements. The terms "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. The term "plurality of" as used in connection with any object or action means two or more of such object or action. A claim element proceeded by the article "a" or "an" does not, without more constraints, preclude the existence of additional identical elements in the process, method, article, or apparatus that includes the element.

Additionally, as used herein and in the appended claims, a "round of golf" means any number of holes of golf played by a golfer, whether competitively, recreationally, or for practice purposes. Further, an "advertisement" or "ad", as used herein and in the appended claims, means any audio, graphical, and/or video image or presentation intended to promote market, or advertise any product or service of any provider, whether such provider is a manufacturer, distributor, or retailer of the good or service. Additionally, the term "golf car," as used herein and in the appended claims, refers to any motorized vehicle, whether electric, hydrogen, or fuel-propelled, which is used on a golf course to transport golfers and/or their equipment. The terms "golf car," "golf cart," "cart," and "car" are used interchangeably.

Generally, the present invention encompasses a system and method for automatically reporting electronically recorded golf scores and optionally other information to a golfer upon completion of a round of golf. In accordance with one embodiment of the present invention, the golfer operates a mobile terminal (e.g., installed in a golf car or hand held by the golfer) during play of a round of golf. The mobile terminal displays at least an electronic score card on its liquid crystal, plasma, transreflective backlit, or other type of display. The mobile terminal may optionally display other information, such as advertisements, distance-to-the-hole information, a layout of the hole, a video flyover of the hole, electronic commerce information, a notepad, a list of clubs, tee times, leader boards, stock reports, sports scores, news headlines, and any other information that may be of interest to the golfer. The mobile terminal may, together with a wireless network and appropriate Internet subscription, also provide the golfers Internet access during play of the round of golf. The golfer may customize the information sent to and displayed by the mobile terminal by accessing a web portal from the mobile terminal itself, a kiosk, and/or a website accessed from a personal or laptop computer, mobile phone, smart phone, or personal digital assistant (PDA) device.

During play of the round of golf, the mobile terminal receives inputs from the golfer through the terminal's user interface to, inter alia, record the golfer's scores obtained during play. The user interface may be a keyboard, keypad or, more preferably, an interactive touch screen incorporated into or onto the display. Other inputs may include, but are not limited to, selection of a displayed advertisement to view more information about the advertised product or service or to purchase the advertised product or service, selection of a "Refreshments" soft key or button to request that the refreshments cart visit the golfer, selection or identification of a golf club used to play the current shot, or notes taken by the golfer for use in playing the hole during the next round of golf.

After the scores have been entered, the mobile terminal wirelessly transmits the scores and/or other information to a central server (e.g., in the clubhouse) via a fixed wireless subsystem. The scores may be conveyed to the central server as they are entered or aggregately upon completion of the round of golf (e.g., upon the processor of the mobile terminal determining that the score on the last hole of the round has been entered and/or that the score card has been electronically signed and attested). The scores and/or other information are then automatically communicated from the central server to an electronic mail (email) server, either directly or via a network operator's host server, and into the email account of the golfer. Alternatively, the scores and/or other information may be communicated to a securely-accessible account of the golfer at a web portal server, thereby allowing the golfer to access the scores and/or other information after or during the round of golf by logging into the golfer's account at a particular web portal, or other websites having embedded hyperlinks to the web portal, via the Internet.

By reporting golf scores in this manner, the present invention allows golfers to expediently receive information in electronic format regarding their most recent play of golf so that the golfers can maintain information on golf courses played in order to assist them in the future play of such courses. Additionally, by optionally displaying advertisements and other information, as well as allowing golfers to select desired advertisements and reporting information relating to the selected advertisements back to the golfer in email format and/or through a password-secure web portal, the present invention enables golfers to recall products in which they may have an interest, as well as providing additional opportunities for advertisers to market their products to the golfers. Additionally, the present invention allows advertisers to selectively market their products to a targeted group of golfers based on the golfers' playing ability (e.g., handicap) or self-described profiles, which profiles may be stored in the host or portal server. For example, an advertiser that is targeting a product only to elite golfers can specify that the particular advertisement be distributed only to golfers on the network having a handicap below a predetermined value (e.g., 10).

The present invention can be more readily understood with reference to FIGS. 1-4, in which like reference numerals designate like items. FIG. 1 depicts an exemplary golf scoring, reporting and marketing system 100 in accordance with one embodiment of the present invention. The depicted system 100 includes a mobile terminal 101, a fixed wireless subsystem 103, and a local server 105. The system 100 may also optionally include a kiosk 107 coupled to the local server 105, a Global Positioning Satellite (GPS) system receiver 109 coupled to or incorporated in the mobile terminal 101, and/or a video camera 111 coupled to or incorporated in the mobile terminal 101. The local server 105, which may be located in the clubhouse or other central location at or near the golf course, is preferably connected via a wireline and/or wireless link to an external communication network 113, such as the Internet, the public switched telephone network (PSTN), a digital subscriber line (DSL) network, a cable network, an integrated services digital network (ISDN), or any other appropriate wide area network. Typically, one golf scoring, reporting and marketing system 100 provides information and services for one clubhouse, golf course, or group of associated golf courses. As a result, multiple scoring, reporting, and marketing systems 100 may be in simultaneous operation throughout a country or other geographic area, and all such systems 100 may be linked to a network operator's host server via the external communication network 113. The local server 105 may also be coupled to a golf handicapping system 115, such as the U.S. Golf Association (USGA) handicapping system, either via a dedicated link or through the external communication network 113.

Several other devices and systems may be coupled to the external communication network 113 in accordance with various embodiments of the present invention. For example, each golf scoring, reporting and marketing system 100 is preferably coupled to a central host server 129 that provides access to an entire network community. In one embodiment, an advertiser's server 117, an email server 119, a web portal server 121, one or more personal computers 123 (one shown), and/or a wireless subscription network 125, such as a cellular data network, may be coupled to the external communication network 113 and used in accordance with the present invention as detailed below. Additionally, the host server 129 is preferably employed to control the distribution of information to and from the web portal server 121 and the various scoring, reporting, and marketing systems 100. The operation of the web portal server 121 may be incorporated into the host server 129 to allow seamless integration of each golf scoring, reporting and marketing system 100 and access to the network from third parties, such as advertisers.

Figure 2:
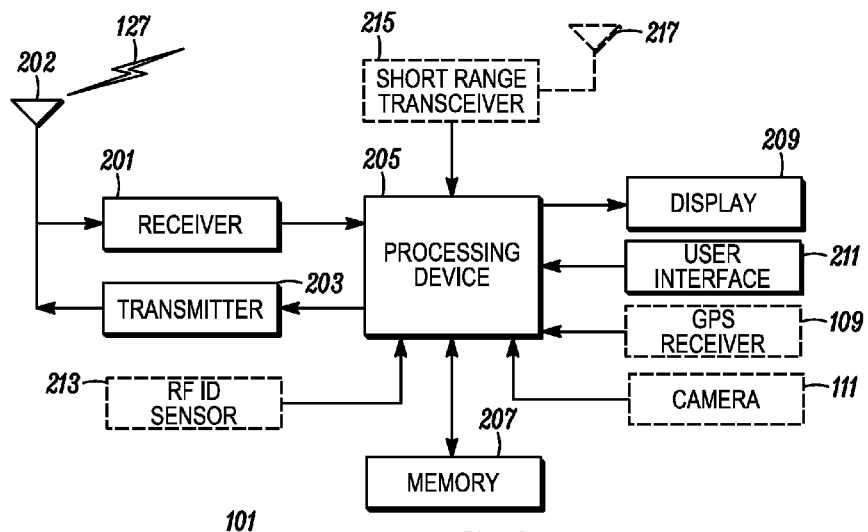
FIG. 2 is an electrical block diagram of a mobile terminal for use in the system of FIG. 1 in accordance with one exemplary embodiment of the present invention.

In one embodiment, the mobile terminal 101 includes a receiver 201, one or more antennas 202 (one shown), a transmitter 203, a processing device 205, memory 207, a monitor or display 209, and a user interface 211, as illustrated in block diagram form in FIG. 2. The mobile terminal 101 may also optionally include the GPS receiver 109 and/or the camera 111 instead of being connected to those devices through external cabling or other connections. The mobile terminal 101 may further include a short range transceiver 215 (or, alternatively, a separate short-range transmitter and receiver) and associated antenna 217 (e.g., that operate according to the Bluetooth wireless standard or any other short-range wireless technology) to allow information to be exchanged in local proximity to the mobile terminal 101. For example, information stored in the memory 207 may be uploaded into a cell phone, personal digital assistant (PDA), digital camera or other personal communication device carried and operated by one of the golfers via the short range transceiver 215 and antenna 217. Alternatively or additionally, information contained in the golfer's personal communication device (e.g., a video of the golfer's golf swing as captured by a video camera embedded in the golfer's cell phone or PDA) may be downloaded to the mobile terminal 101 via the short range transceiver 215 and antenna 217 for display on the mobile terminal's display 209 or for any other use. Information downloaded to the mobile terminal 101 may then be uploaded from the mobile terminal 101 to the web portal server 121 for future reference through the golfer's use of the mobile terminal's user interface 211. The mobile terminal 101 may further include other optional elements, including, without limitation, a microphone to allow the golfer to audibly enter information into the terminal 101 and/or a television tuner/decoder to facilitate reception of broadcast or satellite television channels for viewing on the display 209 or a separate television display (not shown).

Generally, the elements 201-211 of the mobile terminal 101 are conventional elements programmed and arranged to facilitate the transfer of data between the mobile terminal 101 and the fixed wireless subsystem 103 in the manner disclosed herein. For instance, the memory 207 may comprise one or more separate memory elements, such as random access memory (RAM) for temporarily storing, inter alia, information displayed on the display 209, read only memory (ROM) for storing, inter alia, instructions executed by the processing device 205 to enable the mobile terminal 101 to carry out its functions in the system 100, portable memory elements, such as CD-ROMs, digital versatile disks, USB flash drives, and memory sticks, and/or other known or future developed memory devices.

The processing device 205 utilizes conventional signal and data processing techniques to, inter alia, process signals received by the receiver 201 via a wireless communication link 127, generate signals to be transmitted by the transmitter 203 via the communication link 127, receive and process data, video and other information received from the user interface 211, the GPS receiver 109, and/or the camera, and control the display of data, graphics, and video on the display screen of the display 209. The processing device 205 can be a microprocessor, a microcontroller, a digital signal processor (DSP), a state machine, logic circuitry, and/or any other device or combination of devices that processes information based on operational or programming instructions stored in the memory 207. One of ordinary skill in the art will appreciate that the processing device 205 can be implemented using multiple processors as may be required to handle the processing requirements of the present invention. One of ordinary skill in the art will further recognize that, when the processing device 205 has one or more of its functions performed by a state machine or logic circuitry, the memory containing the corresponding operational instructions can be embedded within the state machine or logic circuitry as opposed to being external to the processing device 205 as is illustrated in FIG. 2.

The display 209 may be a liquid crystal display (LCD), a plasma display, a dot matrix display, a transreflective backlit display, or any other display technology that enables viewing of textual, graphical, and/or video information. The user interface 211 preferably comprises a touch screen interface overlaying or incorporated into the display 209 to allow the golfer to simply select displayed information by pressing on appropriate areas of the display 209 with a finger or supplied stylus. Alternatively, the user interface 211 may include a keyboard, keypad, a touchpad, a speech-to-text converter in combination with a microphone, and/or any other means for selecting items or information displayed on the display 209 or entering information into the mobile terminal 101.

The receiver 201 and transmitter 203 comprise various conventional components, including mixers, filters, amplifiers, and other conventional circuitry to enable generation and reception of radio frequency and/or microwave signals from the antenna 202. The receiver 201 and transmitter 203 are configured so as to facilitate wireless communications with the fixed wireless subsystem 103 over the wireless link 127. An exemplary fixed wireless subsystem 103 that may be used in the system 100 of the present invention is disclosed in U.S. Pat. No. 5,469,175, which patent is incorporated herein by this reference as if fully set forth herein.

Operation of the exemplary scoring, reporting and marketing system 100 occurs substantially as follows in accordance with one embodiment of the present invention. A golf car equipped with a mobile terminal 101 is provided to a golfer or a pair of golfers. Alternatively, the mobile terminal 101 may be a stand-alone, hand-held, or other portable device given to the golfer at check-in, but separate from the golf car.

Figure 3:
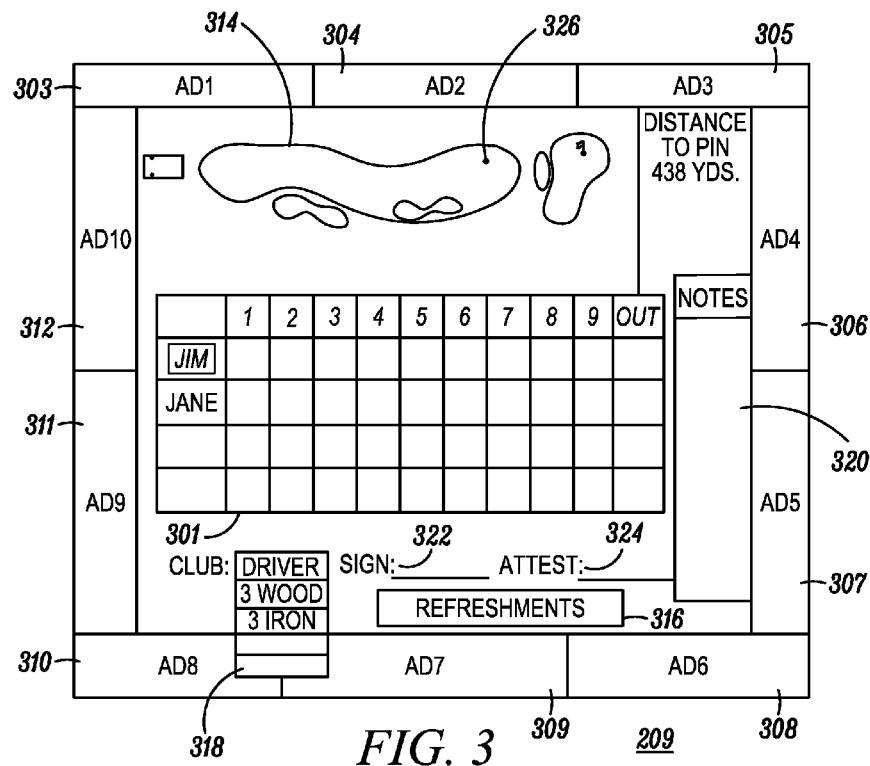
FIG. 3 illustrates an exemplary display of the mobile terminal of FIG. 2 in accordance with one exemplary embodiment of the present invention.

Software stored in the memory 207 of the mobile terminal 101 causes the processing device 205 to display an electronic score card 301 on the display 209, as illustrated in exemplary and simplistic form in FIG. 3 without handicap, course and slope rating, par, or yardage information. One of ordinary skill in the art will readily recognize that such handicap, course and slope rating, par, or yardage information may be included in the displayed scorecard 301. The electronic score card 301 is populated with the names of the golfer(s) (e.g., JIM and JANE in the exemplary card 301 depicted in FIG. 3) by the golf course staff or the golfer(s), either through use of the user interface 211 or through remote downloading of the card 301 over the wireless link 127. For example, the golf course staff may assign the golfers a car in the clubhouse and enter their names into the local server 105 at the time of car assignment. Through operation of appropriate software by the clubhouse server 105, the server 105 communicates the names of the golfers, and optionally the entire format of the scorecard and other items to be displayed on the display 209, to the mobile terminal 101 via the fixed wireless subsystem 103. Upon receipt of the golfers' names, the processing device 205, executing complementary software stored in the memory 207, adds the golfers' names to the score card 301 or displays the score card 301 and/or other information, such as handicap, course and slope rating, par, golf ball location, yardage information, advertisements, and/or various other information, based on control instructions received from the server 105.

In yet another more preferable embodiment, each golfer (e.g., each member of a private golf course) may, upon providing appropriate identification information and optionally credit card information (e.g., where electronic purchases will be permitted) to the golf course operator or the golf membership association to which the golf course is a member, be issued a radio frequency identification (RFID), magnetically encoded, or other type of identification card. Additionally, each mobile terminal 101 or golf car may be configured with an RFID sensor 213 or other applicable detector (e.g., a magnetic swipe detector) to detect the presence of the golfers. In the RFID embodiment, the golfers individually position their RFID cards in front of the sensor 213, which detects the information stored on the card (e.g., name, ID number, handicap, brand of golf clubs used, corporate affiliation, etc.) and provides the information to the processing device 205 for storage in the memory 207 during the round of golf. The processing device 205 also populates the score card 301 with the names of the players and optionally reports the car assignment back to the local clubhouse server 105 via the fixed wireless subsystem 103.

Alternatively and/or additionally, use of the RFID card may cause the mobile terminal 101 to access the golfer's personal profile, which was created by the golfer and is stored in the golfer's user account on the web portal server 121. Any information entered in the user's personal profile can then be transferred over the fixed wireless subsystem 103 directly into the memory 207 of the mobile terminal 101 for use during the game. Such personal profile information may also be supplied to advertisers as discussed in more detail below. Personal profile information can include any information stored on the web portal server 121, such as gender, age, handicap, golf club selections based on yardage to the pin, the golfer's availability for playing a round of golf, whether the golfer desires to see a real-time ticker containing sports scores, news, or stock prices scrolling across the display 209, hobbies, product or other interests, or any other information of a similar nature that enhances the use of the mobile terminal 101 or that may allow information of interest to the golfer to be provided to the golfer via the mobile terminal 101 or otherwise. The mobile terminal's processing device 205 can further use the golfer's personal profile information to function as a sort of "virtual caddie," recommending use of certain golf clubs based on the golfer's current playing circumstances, together with yardage and other course-related information. The recommended clubs would be displayed on the display 209.

The ID card assignment alternative provides several other benefits. For example, such an alternative would permit cardholders to use their ID cards at all golf courses within a pre-established network of courses. For instance, members of Tournament Players Club (TPC) courses could use their ID cards at all TPC courses. Additionally, data (e.g., scores, club selections, notes, and so forth) obtained by the mobile terminal 101 during play at those courses could be communicated to the golfers via email or through storage in the golfers' personal accounts at a web portal, all as discussed in more detail below. Also, for use during tournament play, the location of the golf ball, as well as the identification, affiliation, and real-time scores of all golfers playing in the tournament can be transmitted to the mobile terminal 101 to allow a player to obtain instant feedback about his standing in that particular tournament. This tournament-related information may also be transferred to the clubhouse kiosk 107 and/or to customized web pages that subscriber golfers can access over the Internet.

Figure 4:
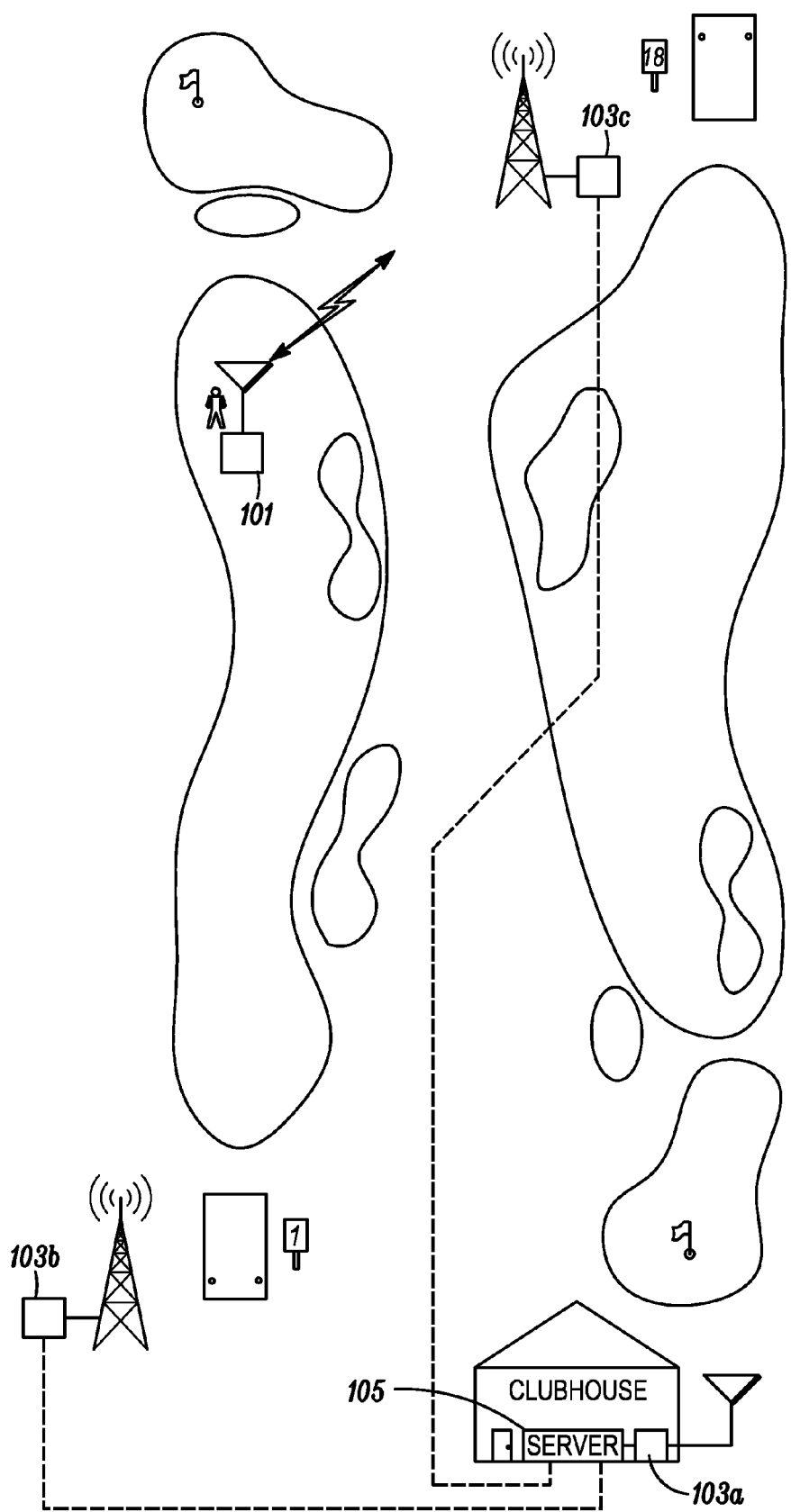
FIG. 4 is a graphical and block diagram depiction of a golf course incorporating the system of FIG. 1 in accordance with one exemplary embodiment of the present invention.

The fixed wireless subsystem 103 may comprise a single base transceiver site located at the clubhouse or other centralized location or may optionally comprise several lower power base transceiver sites or wireless access points distributed throughout the golf course. FIG. 4 illustrates exemplary distribution of three base transceiver sites 103*a*-103*c* at the clubhouse and near the tee boxes of two holes of a golf course. Those of ordinary skill in the art will readily recognize that base transceiver sites may be distributed at other locations around the golf course as is necessary to substantially insure satisfactory wireless communication between the mobile terminal 101 and the local server 105 during play of the round of golf. The distributed base transceiver sites 103*a*-103*c* may be connected to the local server 105 via separate wireline or wireless links in accordance with conventional data transmission techniques. In one embodiment, the fixed wireless subsystem 103 communicates using one or more of the IEEE 802.11a/b/g wireless local area network (WLAN) protocols. Alternate embodiments of the fixed wireless subsystem 103 may use any other wireless communication protocols, including, without limitation, the IEEE 802.16g (WiMAX) protocol.

The mobile terminal display 209, operating under the control of the processing device 205, also displays various other types of information as illustrated in FIG. 3. For example, in one embodiment of the present invention, the display 209 displays a plurality of advertisements 303-312 (ten shown), a graphic layout of the hole 314 presently being played, a distance to the pin (assuming that the mobile terminal 101 or at least the GPS receiver 109 is positioned proximate the current location of the golfer's golf ball), a refreshments soft key or button 316, a pull down menu 318 from which to indicate which club was selected to play the present shot, and an electronic note pad 320 on which the presently active golfer can take notes regarding play of the hole or any other subject so desired. In other embodiments, the processing device 205 might also or alternatively display a video fly over of the hole, distances to various locations on the fairway (e.g., lay-up areas), yardages of drives, television broadcasts, an advertising page of products of interest to the golfer, a searchable electronic catalog or directory of products available from the pro shop or advertisers, any information that is customizable from the golfer's profile page, and/or any other supplemental information that may be of interest to the golfer. While the exemplary display 209 depicted in FIG. 3 illustrates the simultaneous display of the electronic scorecard 301 together with a variety of supplemental information, the scorecard 301 and supplemental information may be separately displayed on the display 209 according to a programmed display routine or responsive to user input or selection.

In another embodiment, the mobile terminal display 209 may display the location 326 of the golfer's golf ball (or the locations of multiple golf balls, such as during a tournament or where two or more players are collectively using the same mobile terminal 101) on the displayed hole 314 or course. For example, each golf ball may include an internal microchip that transmits a location signal either responsive to an external excitation signal (e.g., transmitted by the mobile terminal 101, golf car, or a base transceiver site 103*a*-103*c*) or otherwise. The fixed wireless subsystem 103 or another location-determining system receives the location signal and determines the location of the ball using triangulation or other location-determining techniques. The fixed wireless subsystem 103 may then transmit a message containing the location of the golf ball to the mobile terminal 101 to enable the mobile terminal 101 to indicate the golf ball's location on the display 209. One such microchip-embedded golf ball and golf ball location methodology is disclosed in U.S. Pat. No. 6,524,199, which is incorporated herein by this reference as if fully set forth herein. The locations of the golf balls and the mobile terminals 101 may also be provided to the local server 105 and therefrom to the portal server 121 and/or kiosk 107 so that clubhouse staff and/or other golfers can track play of the golfers via monitors or displays (not shown) coupled to the server 105.

The hole number being played can be determined by the mobile terminal 101 from user input or automatically based on signaling received from distributed base transceiver sites. For example, one of the users may enter the current hole number using the user interface 211 of the mobile terminal 101. Alternatively, the mobile terminal software may automatically start with the first hole and then automatically advance the hole number upon determining that the golfers have completed play of the hole (e.g., upon receiving entry of scores from all players assigned to the mobile terminal 101). Still further, the mobile terminal 101 may use signaling received or lost from the distributed base transceiver sites 103*b*-103*c* to automatically determine that the golf car has exited an area surrounding the green of a previously played hole (e.g., where the base transceiver sites 103*b*-103*c* are positioned near the greens of the golf course) or entered an area surrounding the tee box of a hole to be played (e.g., where the base transceiver sites 103*b*-103*c* are positioned near the tee boxes of the golf course, as illustrated in FIG. 4). Still further, the current hole may be determined by comparing the current location of the mobile terminal 101, as determined using the GPS receiver 109, with a previously stored layout of the golf course. The mobile terminal 101 may make such a determination itself when the layout of the course has been stored in memory 207 or the mobile terminal 101 may occasionally transmit its GPS coordinates to the local server 105 via the wireless communication link 127 and receive hole information from the server 105 based on the server's comparison of the mobile terminal's GPS coordinates to the stored golf course layout.

During play of the round of golf, a first golfer (e.g., JIM in the example illustrated in FIG. 3) selects his name by preferably pressing his or her name on the display touch screen display 209. Once selected, the active golfer's name (e.g., "JIM" in FIG. 3) is preferably highlighted or otherwise emphasized to indicate which golfer is active. The active golfer can then enter various types of information into the mobile terminal 101 as desired. Additionally or alternatively, certain information such as club selection and swing information can be automatically wirelessly communicated to the mobile terminal 101 via the wireless link 127 pursuant to the golfers' profiles as were previously input and stored via the web portal. For example, during play, the golfer may enter which club was selected to play the current shot by selecting the club identifier from a pull down menu 318 or otherwise. The golfer may also enter notes pertaining to the play (e.g., "wet fairway", "strong cross wind", and so forth) or any other information so desired. Alternatively, the mobile terminal 101 may automatically identify the club selection for the player from the golfer's profile downloaded to the mobile terminal 101 from the portal server 121. For example, if Jim has indicated in his stored profile that he hits his 7-iron 140-150 yards, then the GPS mobile unit will show Jim which club to use based on the current distance to the hole. The mobile terminal 101 may also display other caddie-related information based on information in the stored profile, such as lay up areas, recommended procedure for playing the hole (e.g., play down one side or the other of the fairway, watch for hidden bunker on left side of green, etc.), target area for the current shot based on the recommended playing procedure, and any other information that may assist the golfer in playing the round of golf.

The golfer may further select one of the advertisements 303-312 if the golfer is interested in one of the advertised products or services. Each advertisement 303-312 may include textual, graphical, and/or video content at the discretion of the respective advertiser. In one embodiment, the advertiser supplies the desired ad content to the host server 129 via the advertiser's account at the portal server 121 prior to delivery of the ad 303-312 to the mobile terminal 101. Alternatively, the operator of the host server 129 may create canned advertisements (e.g., banner ads) for use by potential advertisers.

Selection of the advertisement may result in additional information (e.g., product price, identification of local retailers selling the product (including, for example, the golf course's pro shop), a telephone number, email address, and/or uniform resource locator (URL) to contact to obtain more information about the product or service, etc.) being displayed related to the selected ad. Alternatively or additionally, selection of an advertisement 303-312 can open a real-time, online instant message chat and/or video session (which may be a two-way video session through use of a webcam (e.g., camera 111) integrated into the mobile terminal 101 or connected as a peripheral device to the mobile terminal 101) with a sales or customer service representative of the advertiser or a third party that sells the advertiser's products and/or services. Additionally, an indication that the ad 303-312 was selected, as well as all other information entered by the active golfer (e.g., club selection, items purchased electronically, etc.), is stored in the memory 127 for later delivery to the local server 105 via the wireless communication link 127.

Further, the names and locations of golfers currently playing, or dates and times that members have pre-selected to play, can be transmitted to other golfers' mobile terminals 101 based on the golfers' signing of an electronic tee sheet. The electronic tee sheet can be displayed on the mobile terminal 101, the kiosk 107, the web portal server 121, or any other websites having embedded hyperlinks to the web portal server 121.

Additionally, if the optional camera 111 is coupled to or integrated into the mobile terminal 101, the active golfer may visually record information related to play of the hole or the golfer's play in general. For example, the golfer may visually record his swing during some or all of the round of golf for immediate viewing on the display 209, or for later viewing alone or with an instructor in order to correct errors in the golfer's swing mechanics. Alternatively or additionally, the golfer may use the camera 111 to video his or her partner's swing for immediate viewing or later use by the partner. The camera 111 may also be used to capture views on the golf course for storage in the golfer's account at the portal server 121 or for email to the golfer's email account on an email server 119 (e.g., together with the electronic scorecard and other information electronically mailed to the golfer upon completion of the round of golf as discussed in detail below). The camera 111 may further be used to take photographs or video of golfer's used equipment for uploading from the mobile terminal 101 to the host server 129 or portal server 121. The used equipment may then be displayed for sale at a used equipment web page or site at the web portal hosted by the portal server 121. Further, the golfer may video his or her swing with a short-range transmission-capable (e.g., Bluetooth-enabled) cell phone, PDA, digital camera, or any other video capture device (not shown) and download the video to the mobile terminal 101 via an optional short-range transceiver 215. Video recorded by the camera 111 or downloaded from a short-range transmission-capable, external video capture device may be stored in the memory 127 in association with the active golfer.

Still further, the active golfer may purchase refreshments or request visitation by a refreshment cart by pressing the electronic or soft "REFRESHMENTS" button or an equivalent. Pressing of the "REFRESHMENTS" button causes a wireless signal to be sent to the local server 105, which in turn causes the computer display within the clubhouse to display a message to the clubhouse staff. The wireless signal preferably identifies the golfer requesting the service as well as the golfer's location as determined via the GPS receiver 109 or any other location-determining methodology. Alternatively, the wireless signal may be sent directly or indirectly (e.g., via the local server 105) to a mobile terminal in the refreshments cart, thereby informing the cart operator to bring refreshments to the golfer. To minimize the time that the refreshment cart needs to spend with the golfers on the course, the golfers may optionally selector order their refreshments from the mobile terminal via an electronic menu displayed on the display 209 prior to or contemporaneous with requesting a visit from the refreshments cart.

The advertisements 303-312 displayed on the display 209 are preferably arranged in a side-by-side manner around at least part of the electronic score card 301. As illustrated in FIG. 3, the ads 303-312 are arranged so as to completely surround the score card 301. However, in alternative embodiments, the ads 303-312 may be presented in any other predetermined arrangement as may create a desired amount of interest from the golfers. Additionally, in accordance with one embodiment of the present invention, the location of and/or length of display time for each ad 303-312 is selected based on ad fees paid by the advertisers. In one embodiment, the advertisers bid on the locations and display times via a web portal maintained by a network operator. In order to bid on the ad locations and display times, the advertisers use their own computers and servers 117 (one of which is depicted in FIG. 1 for illustration purposes) to access the web portal maintained at a portal server 121 controlled by the network operator. The content of the portal hosted by the portal server 121 is controlled by the network operator. However, golfers have access to the web portal server 121 for creating, uploading and/or editing personal profile information, and individual golf courses or membership associations can use the web portal to disapprove any advertisement they do not wish to be displayed on their local systems 100.

By using the external communication network 113 to log into an advertiser portion of the web portal hosted by the portal server 121, the advertisers can view the ad locations and/or display times available for use, as well as the current bids for placement of the ads. For example, each ad space 303-312 and associated display times (e.g., 7:00 AM-10:00 AM; 10:00 AM-1:00 PM; 1:00 PM-4:00 PM; and 4:00

PM-7:00 PM) might be shown in a chart as illustrated in exemplary TABLE 1 below positioned adjacent or generally near a graphical or virtual image of the screen of the display 209 showing the positioning of the ads 303-312 on the display 209. By viewing the virtual image of the display 209, the advertisers can see exactly where and how their ads will appear to the golfers.

TABLE 1

|      | 7:00-<br>10:00 AM | 10:00 AM-<br>1:00 PM | 1:00-<br>4:00 PM | 4:00-<br>7:00 PM |
|------|---------|----------|---------|---------|
| AD1  | $ 500.00 | $ 500.00 | $400.00 | $300.00 |
| AD2  | $1000.00 | $1000.00 | $700.00 | $500.00 |
| AD3  | $ 500.00 | $ 500.00 | $400.00 | $300.00 |
| AD4  | $ 300.00 | $ 300.00 | $200.00 | $100.00 |
| AD5  | $ 300.00 | $ 300.00 | $200.00 | $100.00 |
| AD6  | $ 400.00 | $ 400.00 | $300.00 | $200.00 |
| AD7  | $ 500.00 | $ 500.00 | $400.00 | $300.00 |
| AD8  | $ 400.00 | $ 400.00 | $300.00 | $200.00 |
| AD9  | $ 300.00 | $ 300.00 | $200.00 | $100.00 |
| AD10 | $ 300.00 | $ 300.00 | $200.00 | $100.00 |

As illustrated in exemplary Table 1, the location of AD2 304 on the display 209 depicted in FIG. 3 may be considered the best ad location. As a result, the bid prices would likely be higher for the AD2 ad space. The bidding may be limited to ads displayed on mobile terminals 101 at one golf course or a particular set of golf courses, or may apply to ads displayed on all mobile terminals 101 at association member courses. Similar to other auctions, bid closing times would be identified to allow adequate time to obtain an advertiser's ad artwork and store the artwork in the memory of the local server 105 (or a centralized sever from which the local server 105 retrieves or receives ads for display on the mobile terminal display 209) for distribution to the mobile terminal 101 at the appropriate time(s).

As an alternative to bidding for advertising space, the ad spaces 303-312 may have fixed advertisement fees payable by the advertisers (e.g., to the network operator) based on the location of the space and the time(s) of display. Additionally, advertisers may choose to display certain ads only at specific hole locations or during particular tournaments or tournament types (e.g., charity events, amateur events, etc.). Further, where advertisers desire to market their products or services to certain groups of golfers, the web portal may allow advertisers to purchase ad time for target marketing. For example, a manufacturer of golf clubs may desire to target one type of club to male golfers in a predetermined handicap range and another type of club to male golfers in a different handicap range. Further, the manufacture may desire to target yet a different club to female golfers. Thus, the portal and local server software may be configured to accommodate the advertiser's target marketing by sending targeted advertisements only to those golfers whose personal profiles meet the requirements set by the advertiser. Such targeted advertising may be sent simultaneously to multiple active golfers on multiple golf courses based on each local server's knowledge that the targeted golfers are currently playing.

For example, in one embodiment, golfers may be required to register with the golf course or association in order to obtain an RFID or other ID card. As part of the registration, each golfer may be required to supply information relating to, inter alia, the golfer's handicap, gender, product or service interests, and other demographics. The golf course may store the provided information on the local server 105, which in turn, may report the information to the host server 129 via the external communication network 113. Since the golfers preferably access the mobile terminals 101 with their RFID cards, each local server 105 is aware of the identities of the golfers currently on the course. Each local server 105 may then relay such information to the host server 129, which may transmit specific advertisements to the mobile terminals 101 via the external communication network 113 and each golf course's wireless communication link 127 based on the demographics of the golfers in order to meet the desired target marketing requirements of the advertisers. In other words, an ad targeting a certain demographic group (e.g., cigar smoking males or golfers otherwise indicating an interest in cigars in their personal profiles) may be sent simultaneously or substantially simultaneously from the host server 129 to multiple local servers 105 and then wirelessly to golfers whose personal profiles match the demographics of the targeted group even though the golfers may by playing on multiple, geographically distinct golf courses. Additionally, by interacting with other web sites or services, such as a web-based weather lookup service, advertisers may select to run certain ads only when the weather conditions are favorable to their products (e.g., the mobile terminal 101 may display ads for raincoats, umbrellas or other rain apparel only when it is raining or rain is forecast).

Further the web portal hosted by the portal server 121 may include an area specifically directed to advertisers that allows the advertisers to search in real time for desired advertising targets based on demographics, geography, weather, hole or round score, or any other criteria. For example, software running on the mobile terminal 101 may cause golf scores to be reported automatically from the mobile terminal 101 to the local server 105 upon their entry by the golfers. The local server 105 may then automatically report the scores to the host server 129 or portal server 121 via the external communication network 113 for access by advertisers using the advertiser portion of the web portal. Such automatic reporting enables advertisers to target market in real time based on activity occurring on various golf courses. For instance, if a golfer on a course enters a "1," such a score, once received by the advertisers at the web portal, may trigger the advertisers to send a word of congratulations or a coupon for free or discounted goods or services to the golfer while the golfer is still on the course. As another example, the local server 105 may report back local weather or other conditions, thereby allowing advertisers to send targeted advertising (e.g., for raingear or other products) to the golfers based on the local conditions. In one embodiment, the advertisers can use an automated search criteria to search the scores received from the host server 129 or each local server 105 to search for scores that represent holes-in-one, eagles, or birdies to automatically send words of congratulations or encouragement to the golfers. Additionally, the advertisers can use the reported scores, advertisement selections, and other supplemental information to send follow-up emails to those golfers having profiles, scores, handicaps, or other characteristics that identify them as possible consumers of the advertiser's products or services.

In a more complex embodiment of the present invention, the wireless link 127 may be permanently encrypted or selectively encrypted (e.g., upon receipt of an indication that a golfer desires to make a purchase) to allow golfers to securely make purchases of products or services using the mobile terminal 101. In such an embodiment, some or all of the ads 303-312 may include affiliate links to the websites of the advertisers or third parties from which the advertiser's products or services may be purchased, or to a virtual pro shop on the host server 129 to allow the golfers to purchase the advertised or other products or services. In one embodiment, links to the websites of the advertisers provide access to custom pages created by the advertisers especially for viewing by golfers from their mobile terminals 101 or otherwise. Through the use of such custom web pages, purchases made from the web pages can be tracked and credited to the network operator or a golf course's pro shop. The content of the advertiser-created web pages may include text, video, audio, or still pictures. In one embodiment, the network operator or a golf course pro shop associated with a custom advertiser web page may receive a percentage of the proceeds from the sales of products from that web page.

In addition or in the alternative, the display 209 may include a soft key or button (not shown) for the pro shop to allow the golfers to view and/or keyword search the pro shop's current inventory and make purchases during play of the round of golf. Depending on the particular circumstances, purchases made from the pro shop could be ready for pickup by the golfer upon completion of the round of golf or may be delivered to the golfer at his or her current location on the golf course. For example, if the golfer tore his golf glove and needed another to complete play, the golfer may purchase the glove from the pro shop via the mobile terminal 101 while on the course and have the glove delivered by a course employee to allow the golfer to use the glove to complete play of the round. In an alternative embodiment, in order to generate additional revenue for the golf course and/or the host(s) or operator(s) of the host server 129 and/or the portal server 121, the golf course owner and/or server operator(s) may receive a portion of the proceeds of each sale of an advertiser's products purchased from the pro shop or the advertiser's web site via the mobile terminal 101 or the kiosks 107, or from the web portal or in response to an email generated by the host server 129 or the portal server 121.

In an analogous manner, general advertising may be provided based on displayed keywords. For example, the host server 129 or the portal server 121 may display a set of searchable or non-searchable keywords on the display 209. The keywords preferably relate to a type of product or service (e.g., drivers, putters, club re-gripping, etc.). The keywords may alternatively relate to product brands (e.g., NIKE, TITLEIST, CLEVELAND GOLF, etc.) or association certifications, approvals or relationships (e.g., PGA approved, official products of the PGA, etc.). If the player has an interest in one of the displayed keywords, the player can then use the user interface 211 to select the keyword. Upon detecting selection of the keyword, the mobile terminal's processing device 205 retrieves from memory 207 or from the appropriate server 121, 129 a list of products or services, or a set of ads for the selected types of products or services. The list of products or product-related ads are displayed to the golfer. The ads may be displayed or arranged based on ad fees paid by the advertisers, which fees may have been bid upon by the advertisers as discussed above. The golfer can then select one of the products or services listed or advertised in the event that the golfer has an interest in such product or service. The selected ad or product is then recorded by the processing device 205 and stored in memory 207 for later transmission to the portal server 121 and/or host server 129 via the wireless link 127 and the local server 105. Ultimately, information pertaining to the selected ad, product or service may be automatically sent to the golfer's email account on the appropriate email server 119 and/or to the golfer's web portal account.

The web portal hosted by the portal server 121 may be accessed and used by golfers from their own personal computers 123 or via a kiosk 107 at the clubhouse or elsewhere (e.g., which may be accessed using the golfer's ID card, password, or passcode) to create a personal profile and/or customize the display of supplemental information on the mobile terminal display 101. For example, after registering with the golf course or association and obtaining or selecting a user name and password, a golfer may access his or her own personal account on the portal server 121 via the web portal. Access to the web portal may be by username and password (e.g., from a home PC 123, the kiosk 107, or the mobile terminal 101) or via use of the golfer's ID card (e.g., via the kiosk 107 or mobile terminal 101).

In one embodiment, the web portal provides the option of customizing the mobile terminal display 209. Upon selecting a link to this option, the web portal preferably shows a virtual display and default displayed information, including the electronic scorecard 301 and other supplemental information, such as ads 303-312, a hole graphic 314, a club selection drop-down menu 318, and so forth. The golfer can then use his or her own personal computer (PC) 123, the kiosk 107, or other data communication device (e.g., handheld or wireless data terminal, cell phone, PDA, or multi-purpose device) to select, via the web portal, which supplemental information to display and to customize the arrangement of such information on the display 209, with the possible exception of the locations of the ads 303-312 which are under the control of the host server 129 or network operator as discussed above. As one example, if the golfer desired to see a fly over of the hole before displaying the hole graphic 314, the golfer could select such an option from a variety of options available at the web portal. As another example, the golfer could use the web portal to customize how the various items of supplemental information appear on the display 209. Display arrangement customization can be performed in any conventional manner via the web portal, such as by using drag-and-drop techniques or by selecting identities of predetermined display areas, and so on. In one embodiment, mobile terminal display customization is performed by the golfer through use of a conventional widget toolkit to customize computer widgets or plug-ins, such as buttons, drop-down lists, toolbars, icons, windows and various other virtual control elements, to organize and arrange the mobile terminal's display 209 and provide a graphical user interface for the mobile terminal 101 as desired by the particular golfer. The customized widgets would then be communicated to the mobile terminal 101 to control the mobile terminal's display 209 and provide the golfer's desired user interface upon the mobile terminal's determination that the golfer was using the mobile terminal 101 during a round of golf, as described in more detail below.

The golfer may also use the web portal to create and save a custom user profile. The profile may include the display arrangement discussed above, as well as other information, such as handicap, gender, corporate affiliation, club selection information, food or drink preferences, swing video, credit card number to be used for purchases, product or service interests, hobbies, financial information, recommended procedures for playing holes at various golf courses, an indication that the golfer is available to play at certain times of the week and/or that the golfer enjoys certain types of play (e.g., Skins play, best ball play, Nassau game play, and so forth), preferred playing times, etc. Once the golfer has completed his or her display customization and/or customer profile, the customized information is stored in the memory of the portal server 121. A golfer may also use the web portal to set up a match with other golfers, reserve tee times, make friendly wagers, purchase merchandise from an online store or golf course pro shop, view golf course information, view news regarding the PGA tour, the Senior Tour, the LPGA tour, or present or past professional golfers, and/or hyperlink to other golf-related or sports-related websites.

In the event that the golfer has stored a customized profile and/or display at the portal server 121, when the golfer visits the golf course to play a round of golf and uses his or her ID card to access the mobile terminal 101, the mobile terminal 101 may send a message to the local server 105 via the wireless communication link 127 and the fixed wireless subsystem 103 requesting the golfer's profile and customized display information. In one embodiment, the local server 105 retrieves the customization information from the portal server 121 via the external communication network 113. The local server 105 then transmits the customization information to the mobile terminal 101 via the wireless link 127 and the mobile terminal 101 stores the customization information in memory 207 for use when the golfer is actively using the display 209.

For example, if "JIM" had customized his display prior to commencing play, then when "JIM" logs into the mobile terminal 101 through use of his RFID card, the mobile terminal processing device 205 sends a wireless message to the local server 105 requesting Jim's customized display. The local server 205 then accesses the portal server 121 over the external communication network 113 (e.g., the Internet) and retrieves Jim's display information (e.g., the supplemental information to be displayed as selected by Jim together with control information containing instructions for arranging the supplemental information on the display 209 in accordance with Jim's stored arrangement). Upon acquiring Jim's display information, the local server 105 transmits the display information to the mobile terminal 101, which in turn stores the display information in the memory 207. Upon determining that Jim is the active terminal user (e.g., by detecting that the name "JIM" has been pressed on the touch screen display 209 or otherwise selected using the mobile terminal's user interface 211), the mobile terminal processing device 205 retrieves Jim's customized profile and display information along with the display control instructions from memory 207, and presents the display information on the display 209 in accordance with the control instructions. To inform the golfers as to which golfer is presently active, the name of the active golfer may be highlighted, shown flashing or blinking, shown in bold or a predetermined color, or otherwise emphasized on the score card 301.

During play of the round of golf, the processing device 205 of the mobile terminal 101 receives and records various inputs entered by the golfer(s) and stores the inputted information in a relational database in memory 207. For example, in one embodiment, all the information selected or inputted by player one (e.g., JIM) or automatically determined by the processing device 205 to relate to player one's play is stored in memory 207 and associated with player one's ID. The information input by player one or automatically determined by the processing device 205 to relate to player one's play may include, without limitation, scores obtained during play of the holes in the round of golf, identifications of advertisements selected by the player, club selections and pin distances, course or play notes, par 3 poker card values, Nassau or match play scores, list of refreshments ordered, list of other players in the player's twosome or foursome, amount of time taken to play the round, video of the player's golf swing, game results, video, team photos, pictures of stance views, driving distance, friendly wagers won or lost, etc. All relevant information may be communicated to the host server 129 via the wireless link 127 and the external network 113, and archived in the player profile for future retrieval during or after play. Similarly, information selected or input by player two (e.g., JANE) or automatically determined by the processing device 205 to relate to player two's play is stored in memory 207 and associated with player two's ID.

The electronic scorecard 310 and other information entered by the players or otherwise determined by the mobile terminal 101 and associated with the players is wirelessly transmitted to the local server 105 via the wireless communication link 127 and the fixed wireless subsystem 103. In a preferred embodiment, the scores and/or other player-related information are transmitted to the local server 105 automatically upon completion of the round of golf or completion of the electronic score card 301. Completion of the round of golf may be automatically determined upon entry of both players' scores (or a single player's score where only one player has been assigned the golf car or the mobile terminal 101) in the electronic score card 301 for the last hole of the round. Alternatively, completion of the round of golf may be determined upon receipt of both the player's electronic signature 322 and an attesting player's electronic signature 324 attesting to the scores entered by the player into the electronic scorecard 301. Still further, completion of the round of golf may be determined by the player's affirmative response to a query presented on the display 209 of the mobile terminal 101 inquiring as to whether play has been completed. Completion of the score card 301 may be determined by detecting that entries have been received by each player assigned to the golf car or mobile terminal 101 for each hole of the round or by detecting that the player and the attesting player have both electronically signed the score card 301. Alternately, each golfer may choose not to have his or her score sent to the network, but may still have access to the other benefits of the system 100, such as the virtual caddie or receiving emails from selected advertisers or regarding user-selected products.

In another embodiment of the present invention, players using the local golf scoring system 100 can take advantage of the networked capabilities of the host server 129 to other local systems by having tournament or match play competitions. The competitions may be played against members of the same local system 100, or members of other local systems linked through the host server 129, in real-time or staggered in time. This feature provides a means for golfers to interact easily and accurately in a competitive, social network. For example, one group of players can set up a match play with other players on the network. The two (or more) groups can play simultaneously and each team has instant access to the performance of the other team. The network's host server 129 tracks the location and scores of each member of the group. Logging the scores into the host server 129 for later access provides an automatic standing sheet for each player in a golf-course sponsored event or golfer-initiated league. The outcome of each match, which may include a golfer-defined point system or even friendly wagering, is automatically sent to each member of the league or to those to whom the match point system or wagering pertains. Additionally, the system may track any fees, including friendly wagers, each member owes for league or social play.

In an alternative embodiment, the scores and/or other player-related information may be wirelessly transmitted to the local server 105 in real time, at intermittent or periodic intervals (e.g., after completion of play of a hole, every half hour, after a player's selection of an advertisement, and so on), or upon the request of the player(s). The update rate may depend upon various factors, including the characteristics of the wireless network, bandwidth availability, and distance from the mobile terminal 101 to the fixed wireless subsystem 103.

Some time after receiving the scores and other player-related information from the mobile terminal 101, the local server 105 automatically communicates at least the scores and, more preferably, the other player-related information or supplemental information associated with the player-related information to an email server 119 hosting an email account of the player. For example, the local server 105 may send the electronic scorecard 301, ad images or other information related to advertisers sponsoring or identified in ads that were selected by the player during play of the round of golf (e.g., hyperlinks to web sites of the advertisers or to web sites at which the advertiser's products or service may be purchased), identifications of clubs selected and used by the player at particular times during play (e.g., based on distances to the pin), video of the player's swing as captured by the video camera 111, notes taken by the player during play, final tournament standings, tournament video or pictorial images, and other information of interest to the player's email account via the external communication network 113. Alternatively, the scorecard 301 and/or supplemental information may be sent by the local server 105 to the host server 129, which in turn sends the received information to the golfer's email account. In a preferred embodiment, communication of the scores and/or other player-related or supplemental information to the player's email account occurs after completion of the round of golf. Alternatively, communication of the scores and other information to the player's email account may occur at any other time, including in real time, as so desired by the player, the golf course operator, the applicable association or membership, or the network operator.

An exemplary email sent to the email account of golfer JIM of FIG. 3 may be as follows:

Jim,
Thank you for playing in the American Red Cross Golf Tournament on Jul. 1, 2006. Here is your score card:
[Insert Electronic Scorecard]
Here is information on the Callaway Driver you were interested in: www.callawaygolf.com.
Here is information on the Rolex watch you were interested in: www.rolex.com
To see your stats, click here: [URL link to stats]
Click here for your team photo from the American Red Cross Golf Tournament: arcgt_team1.jpeg After the scores and the optional supplemental information have been sent as an email to the golfer's email account, the golfer may receive the email using any one or more of a variety of email viewing devices. For example, upon returning home or to the office, the golfer may operate a PC 123 connected to the Internet 113 to retrieve the email from the golfer's email account on the email sever 119 (e.g., the email server hosted by the golfer's Internet service provider). Alternatively, the golfer may use a BLACKBERRY, TREO, iPHONE, MOTOQ, or other handheld, portable, or mobile device (not shown) to access the email via an associated wireless subscription network 125 that is coupled to the Internet or another external communication network 113 to which the email server 119 hosting the golfer's email account is connected. Still further, the golfer may access the electronically mailed information via the web portal by logging into the golfer's personal account at the portal. Still further, the golfer may obtain his scores and other information relating to the round of golf just played by printing such information at a kiosk 107 located in the clubhouse or another central location. In accordance with known techniques, software operated by the kiosk 107 retrieves the golfer's scores and other information from the local server 105 or the host server 129 based on inputs received from the golfer via the kiosk's user interface (e.g., keyboard or touch screen).

Communication of the scores and other information to the golfer enables the golfer to more readily track and analyze his or her play, thereby providing data upon which to base actions for improving play. For example, since the golfer's scores, optional swing video, optional club selection based on pin distance, and/or other information acquired during play are automatically provided to the golfer via email in accordance with the present invention, the golfer can then easily retrieve the information from his email and forward it to the golfer's instructor via email, or burn it on a CD or DVD, for purposes of targeting instruction to improve the golfer's play or for any other reason. Additionally, communicating information to the golfer relating to selected advertisements, such as hyperlinks to web sites at which selected advertisers' goods or services may be purchased, provides a reminder to the golfer regarding potentially desired purchases, as well as providing the advertisers additional opportunities to market their products or services to buyers having already shown a level of interest in their products or services.

In addition to sending the player's golf scores to the player in an email and adding the scores to the player's web portal account, the local server 105 or the host server 129 optionally sends the scores to a handicapping system or handicap-determining application server 115 either directly (where a dedicated physical and/or logical link is provided between the local server 105 and the handicapping system 115) or indirectly via the external communication network 113. By automatically sending the golfer's scores to the handicapping system 115, such scores are automatically used to determine the player's present handicap.

Alternatively, handicap-determining software (e.g., software licensed from the USGA or independently created) may be stored in the memory 207 of the mobile terminal 101 or at the local server 105. Additionally, the golfer's most recent scores, as well as the course and slope ratings for the courses played (e.g., for the last twenty (20) rounds of golf or for the most recent rounds of golf that are used for computing the golfer's handicap), may be stored at the host server 129 or portal server 121 (e.g., during creation of the golfer's profile and thereafter automatically updated by the golf scoring and reporting network 100 or manually updated by the golfer through the web portal hosted by the portal server 121). In such a case, the display 209 may include a USGA handicap logo or other handicap identifier (not shown), which, upon selection by the golfer, results in the processing device 117 retrieving the golfer's most recent scores and the course and slope ratings from the memory 207 (if stored in the memory 207 as part of the golfer's retrieved profile), the local server 105, the host server 129, or the portal server 121, as applicable. Once retrieved, the golf scores used for handicap determination are shown to the golfer on the display 209, optionally together with the golfer's handicap and/or the course and slope ratings. Upon completion of the round of golf, the processing device 117 automatically, or responsive to user input, executes the handicap-determining software to re-compute the golfer's handicap and sends the handicap, round score, and course and slope rating (and optionally all the scores and course and slope ratings used to re-compute the handicap) to the host server 129 and/or the portal server 121 via the wireless subsystem 103 and the local server 105. The portal server 121 may then store the round score, the newly computed handicap, the course and slope rating and various other supplemental information, as discussed above, in the golfer's portal account. Additionally, the host server 129 may send the handicap, course and slope rating, round score, scorecard, and other supplemental information to the golfer's email account via the external communication network 113.

In an alternative embodiment, when the handicap-determining software is located in the local server 105, the processing device 117 sends the scorecard and round score to the local server 105 for automatic computation of the golfer's new handicap upon completion of the round of golf. Upon computing the handicap in this embodiment, the local server 105 forwards the new handicap, scorecard, course and slope rating, and other applicable supplemental information to the host server 129 and/or portal server 121 for storage in the golfer's portal account and for transmission to the email account of the golfer. In an alternative embodiment, the host server 129, upon receiving the electronic scorecard, course and slope rating and other supplemental information from the local server 105, may compute or re-compute the golfer's handicap using any desired handicap calculator, such as, for example, the USGA handicap calculation algorithm, and send the computed handicap together with the scorecard and other supplemental information to the golfer's email account and/or the golfer's web portal account at the portal server 121. In yet another embodiment, handicap computation may instead be performed at the portal server 121. The above-described automatic submission of scores to the handicapping system 115 or computation of handicap at the mobile terminal 101, the local server 105, the host server 129, or the portal server 121 eliminates or at least substantially curtails selective reporting of golf scores for purposes of establishing a handicap, which is often engaged in by recreational golfers.

Additionally, the system 100 of the present invention allows advertisers to receive marketing feedback from the golf course, association, or network operator in order to determine the effectiveness of advertising their products and/or services on the mobile terminal display 209. By logging all the advertisement selections made by golfers at the mobile terminal 101 and reporting the selections to the host server 129, the host server 129 can report the selection activity related to the particular advertisers' products to the advertisers to provide the advertisers valuable feedback relating to the effectiveness of their on-car advertising. In one embodiment, the host server 129 automatically sends ad selection or touch reports to each advertiser's server 117 via the external communication network 113 at regular or periodic intervals (e.g., once a month or once a week). Alternatively, the host server 129 may send ad selection reports to an advertiser only upon receiving a request for such reports from the advertiser (e.g., via the advertiser's server 119).

In yet another embodiment, the host server 129 may report the contact information (e.g., email addresses), as well as the demographic and/or identity information, of golfers who selected an advertiser's ad on the mobile terminal 101 to the advertiser, for example, together with the advertisement selection activity. As discussed above, the mobile terminal 101 is aware of which golfer is presently using the mobile terminal 101 due to the golfer's selection of his or her name (or simply by virtue of use of the mobile terminal 101 when only one golfer has been assigned to use the mobile terminal 101) prior to entry of the golfer's score or other mobile terminal activity. The mobile terminal 101 relays the golfer identification to the local server 105, which in turn forwards the information to the host server 129 to enable the host server 129 to email the electronic scorecard 301 and supplemental information to the golfer's email account and/or supply the scorecard 301 and supplemental information to the golfer's account at the web portal hosted by the portal server 121. As a result of such feedback from the golf score and reporting network 100, advertisers may send emails containing various content, including text, video, and/or graphics, to the email accounts of golfers that selected their ads during play of a round of golf, thereby allowing the advertisers to customize their marketing to the particular golfers based on the golfers' demographics.

As described above, the present invention encompasses a golf scoring, marketing and reporting system and method of operation. With this invention, golfers may, without additional action or effort, expediently receive information in electronic format regarding their most recent play of golf so that the golfers can maintain information on golf courses played in order to assist them in the future play of such courses. Additionally, by optionally displaying advertisements and other information, as well as allowing golfers to select desired advertisements and reporting information relating to the selected advertisements back to the golfer in email format, the present invention enables golfers to recall products in which they may have an interest as well as providing additional opportunities for advertisers to market their products to the golfers. Further, by optionally requiring advertisers to bid on the times and locations of their ads on the mobile terminal's display, revenue for the network operator can be enhanced. Such revenue can be further enhanced by the network operator's, golf course's, or association's receipt of a percentage of the proceeds resulting from sales of products marketed through the mobile terminal.

In the foregoing specification, the present invention has been described with reference to specific embodiments. However, one of ordinary skill in the art will appreciate that various modifications and changes may be made without departing from the spirit and scope of the present invention as set forth in the appended claims. For example, the mobile terminal 101 may further include a television tuner/decoder to allow broadcast or satellite television programming to be received and displayed on the display 209. Alternatively, the mobile terminal 101 may include applicable plug-ins and other wireless downloads to facilitate display of streaming audio, video, and/or textual data supplied by the local server 105 via Internet servers (not shown) connected to the external communication network 113. Accordingly, the specification and drawings are to be regarded in an illustrative rather than a restrictive sense, and all such modifications are intended to be included within the scope of the present invention.

Benefits, other advantages, and solutions to problems have been described above with regard to specific embodiments of the present invention. However, the benefits, advantages, solutions to problems, and any element(s) that may cause or result in such benefits, advantages, or solutions to become more pronounced are not to be construed as a critical, required, or essential feature or element of any or all the claims. The invention is defined solely by the appended claims including any amendments made during the pendency of this application and all equivalents of those claims as issued.

What is claimed is:

1. A golf-related marketing and reporting system comprising:
a first server coupled to an external communication network and operable to store personal accounts of a plurality of golfers, each personal account including a user profile, each user profile created and customized by a respective golfer prior to play of a round of golf and including at least demographic information for the respective golfer, wherein the demographic information for the respective golfer includes at least gender, product interests, and/or service interests, the first server being further operable to:
receive advertisements from a plurality of advertisers,
receive information identifying golfers of the plurality of golfers that are playing rounds of golf, and
communicate an advertisement of the received advertisements to a group of golfers that are playing rounds of golf based on target marketing requirements of an advertiser of the advertisement and demographic information for each golfer in the group of golfers, wherein the target marketing requirements include corresponding demographics of golfers to which the advertisement is to be communicated;
a mobile terminal operable by a golfer during play of one of the rounds of golf, the golfer having the corresponding user profile stored in the corresponding personal account at the first server, the mobile terminal including:
a processing device operable to control operation of the mobile terminal and to determine an identification of the golfer;
a transmitter operable under control of the processing device to wirelessly transmit at least the identification of the golfer;
a receiver operable under control of the processing device to wirelessly receive, subsequent to transmission of the identification of the golfer, at least one advertisement, wherein the at least one advertisement includes the advertisement of the advertiser when the demographic information stored in the user profile of the golfer matches demographics included in the target marketing requirements of the advertiser;
a display, including a display screen, operable under control of the processing device to display the at least one advertisement and information relating to the round of golf being played by the corresponding golfer; and
an electronic golf scorecard displayed on the display screen and including the information relating to the round of golf comprising a set of scores of the corresponding golfer for a round of golf,
an electronic mail account of the corresponding golfer, the mobile terminal operative to automatically communicate the set of scores on the electronic golf score card to at least the corresponding electronic mail account, at least upon the completion of the round of golf,
the completion of the round of golf being determined by the electronic golf scorecard being filled out with the set of scores and the receipt of an attesting electronic signature on the electronic golf scorecard,
a user interface operable to receive inputs from the golfer during the round of golf, the golfer inputs including the set of scores on the electronic golf score card and a selection of an advertisement of the at least one advertisement,
wherein the transmitter is further operable under the control of the processing device to transmit information related to the selected advertisement;
a fixed wireless subsystem operable to at least receive the identification of the golfer and the information related to the selected advertisement from the mobile terminal and to transmit the at least one advertisement to the mobile terminal; and
a second server operably coupled to the fixed wireless subsystem and the external communication network, the second server operable to at least:
receive the identification of the golfer from the fixed wireless subsystem,
communicate the identification of the golfer to the first server via the external communication network,
receive the at least one advertisement from the first server via the external communication network subsequent to communication of the identification of the golfer to the first server,
communicate the at least one advertisement to the fixed wireless subsystem for provision to the mobile terminal,
receive the information related to the selected advertisement from the fixed wireless subsystem subsequent to communication of the at least one advertisement to the fixed wireless subsystem, and
communicate the information related to the selected advertisement to the first server via the external communication network.

2. The system of claim 1, wherein the mobile terminal further includes an identification card detector operable under control of the processing device to detect a presence of the golfer at the mobile terminal, and wherein the processing device determines the identification of the golfer responsive to detection of an identification card of the golfer by the identification card detector.

3. The system of claim 1, wherein the user interface of the mobile terminal is a touch screen interface that is incorporated into the display of the mobile terminal.

4. The system of claim 1, wherein the transmitter of the mobile terminal is further operable under control of the processing device to transmit a request for a user profile of the golfer, the user profile of the golfer being stored in a personal account of the golfer at the first server and including personal profile information, supplemental information to be displayed to the golfer during the round of golf, and display arrangement instructions for displaying at least the supplemental information to the golfer at the mobile terminal, the display arrangement instructions corresponding to display arrangement customization performed by the golfer via the first server prior to the round of golf;
wherein the receiver of the mobile terminal is further operable under control of the processing device to wirelessly receive the display arrangement instructions and at least some of the supplemental information responsive to transmission of the request for the user profile of the golfer;
wherein the display of the mobile terminal is further operable under control of the processing device to display at least some of the received supplemental information according to the display arrangement instructions;
wherein the fixed wireless subsystem is further operable to receive the request for the user profile of the golfer from the mobile terminal and to transmit the display arrangement instructions and at least some of the supplemental information to the mobile terminal; and wherein the second server is further operable to receive the request for the user profile of the golfer from the fixed wireless subsystem, automatically communicate the request for the user profile of the golfer to the first server via the external communication network, receive the display arrangement instructions and at least some of the supplemental information from the first server via the external communication network responsive to the request for the user profile of the golfer, and communicate the display arrangement instructions and at least some of the supplemental information to the fixed wireless subsystem for provision to the mobile terminal.

5. The system of claim 1, wherein the information relating to the round of golf displayed on the display includes the electronic scorecard, wherein the golfer inputs received by the user interface further include the set of scores entered into the electronic scorecard, wherein the transmitter is further operable under the control of the processing device to transmit the scores to the fixed wireless subsystem, wherein the fixed wireless subsystem is further operable to receive the scores from the mobile terminal, wherein the second server is further operable to communicate the scores to the first server via the external communication network, and wherein the first server is further operable to receive the scores from the external communication and automatically communicate the scores to the electronic mail account of the golfer via at least the external communication network.

6. The system of claim 1, wherein the demographic information stored in the user profile of the golfer includes a golf handicap for the golfer.

7. The system of claim 1, wherein the fixed wireless subsystem and the second server are located on grounds of a golf course being played by the golfer and wherein the first server is located remotely from the golf course.

8. The system of claim 1, further comprising a kiosk coupled to the second server and located on grounds of a golf course being played by the golfer, the kiosk being operable to enable the golfer to at least one of: access an electronic tee sheet, purchase one or more products advertised in the at least one advertisement, and access the personal account of the golfer.

9. A method for automatically providing information to a golfer during play of a round of golf, the method comprising:

entering and customizing, by golfer inputs prior to a round of golf, a user profile, including demographic information of the golfer, wherein the demographic information of the golfer includes at least gender, product interests, and/or service interests; storing the user profile in a personal account of the golfer at a remote server, the user profile further including supplemental information to be displayed to the golfer during the round of golf on a display screen of a mobile terminal of the golfer;

determining, by the mobile terminal operable by the golfer, an identification of the golfer;

wirelessly transmitting, by the mobile terminal, the identification of the golfer;

wirelessly receiving, at the mobile terminal and subsequent to transmission of the identification of the golfer, at least one advertisement providing targeted advertising to a group of golfers having demographics that match target marketing requirements of at least one advertiser of the at least one advertisement, the golfer being included in the group of golfers based on the demographic information for the golfer stored in the user profile of the golfer at the remote server, displaying, on the display screen of the mobile terminal, the at least one advertisement and further displaying on the display screen an electronic scorecard including the golfer inputs of a set of scores of the round of golf;

wirelessly transmitting, by the mobile terminal, a request for the user profile of the golfer, the user profile further including the supplemental information to be displayed to the golfer during the round of golf;

wirelessly receiving, at the mobile terminal and displaying, on the display screen of the mobile terminal, at least a portion of the supplemental information relating to the round of golf as requested by the golfer, and determining, by the mobile terminal, whether the electronic golf score card has been completed; and wirelessly transmitting information based on the golfer inputs further includes wirelessly transmitting at least the set of scores upon determining that the electronic golf score card has been completed;

determining whether the electronic golf score card has been completed includes determining whether the electronic golf score card has been filled out by the golfer; and determining whether the electronic score card has been completed further includes determining whether an electronic signature of a second golfer has been received on the electronic golf scorecard.

10. The method of claim 9, further comprising: receiving, at the mobile terminal, inputs from the golfer during the round of golf, the golfer inputs including selection of an advertisement of the at least one advertisement; and wirelessly transmitting, by the mobile terminal, information related to the selected advertisement responsive to receipt of the golfer inputs.

11. The method of claim 10, wherein wirelessly transmitting information related to the selected advertisement comprises:

wirelessly transmitting information relating to the selected advertisement to the personal account of the golfer via at least the remote server.

12. The method of claim 11, wherein the information relating to the selected advertisement includes a hyperlink to a web site at which products of an advertiser identified in the selected advertisement can be purchased.

13. The method of claim 9, wherein the step of displaying the at least one advertisement comprises:

displaying, on the display screen of the mobile terminal, a plurality of advertisements in a predetermined arrangement.

14. The method of claim 13, wherein the predetermined arrangement includes positioning each of the plurality of advertisements in a side-by-side arrangement around at least part of the display screen.

15. The method of claim 14, wherein the predetermined arrangement includes a plurality of advertisement positions, wherein each advertisement position is associated with a respective advertisement fee.

16. The method of claim 15, wherein the respective advertisement fee results from bidding among prospective advertisers.

17. The method of claim 14, wherein the predetermined arrangement includes a plurality of advertisement positions, wherein a length of time during which an advertisement is displayed at each advertisement position is associated with a respective advertisement fee.

18. The method of claim 13, wherein the predetermined arrangement includes positioning the plurality of advertisements in a side-by-side manner so as to completely surround the displayed electronic golf score card.

19. The method of claim 18, wherein the predetermined arrangement includes a plurality of advertisement positions, wherein each advertisement position and/or a length of time during which an advertisement is displayed at an advertisement position is associated with a respective advertisement fee.

20. The method of claim 9, further comprising:
wirelessly transmitting, by the mobile terminal, a request for display arrangement instructions for displaying at least the supplemental information to the golfer on the display screen of the mobile terminal, the display arrangement instructions corresponding to display arrangement customization performed by the golfer via the remote server;
wirelessly receiving, at the mobile terminal and responsive to the user profile request, the display arrangement instructions and at least some of the supplemental information;
displaying, on the display screen of the mobile terminal, the information relating to the round of golf and at least some of the received supplemental information according to the display arrangement instructions;
receiving, at the mobile terminal, inputs from the golfer during the round of golf, the golfer inputs relating at least to the round of golf; and
wirelessly transmitting, by the mobile terminal, information based on the golfer inputs to the personal account of the golfer via at least the remote server.

21. The method of claim 20, wherein the round of golf is being played on a first golf course and a second round of golf is being played on a second golf course, the two rounds of golf forming at least part of a golf event, wherein the mobile terminal is located at the first golf course, and wherein the golfer inputs include scores entered into a first electronic golf score card displayed on the display screen of the mobile terminal, the method further comprising:
receiving, by a second mobile terminal located at the second golf course, a second set of inputs into a second electronic golf score card from at least a second golfer during the second round of golf, the second set of inputs including a second set of scores obtained during play of the second round of golf;
wirelessly transmitting, by the second mobile terminal, at least the second set of scores to the mobile terminal located at the first golf course; and
displaying, by the mobile terminal located at the first golf course, the second set of scores on the display screen of the mobile terminal as a standing sheet for the golf event.

22. The method of claim 20, wherein the step of receiving inputs from the golfer further comprises: receiving identifications of golf clubs used at particular times during play of the round of golf.

23. The method of claim 20, wherein wirelessly transmitting information based on the golfer inputs comprises:
wirelessly transmitting information relating to distances between locations of a ball of the golfer and hole pins electronically measured during play of the round of golf.

24. The method of claim 20, wherein the golfer inputs include scores entered into an electronic golf score card displayed on the display screen of the mobile terminal, the method further comprising:
determining, by the mobile terminal, whether the electronic golf score card has been completed;
wherein the step of wirelessly transmitting information based on the golfer inputs further includes wirelessly transmitting at least the scores upon determining that the electronic golf score card has been completed.

25. The method of claim 9, wherein the golfer is accompanied by the second golfer, the method further comprising:
receiving, by the mobile terminal, the electronic signature of the second golfer attesting to the scores entered into the electronic golf score card;
wherein determining whether the electronic golf score card has been completed includes:
determining whether the electronic golf score card has been filled out by the golfer; and
determining whether the electronic signature of the second golfer has been received on the electronic golf score card.

26. The method of claim 20, further comprising:
upon completion of the round of golf, automatically communicating at least the set of scores to an electronic mail account of the golfer via at least the remote server.

27. The method of claim 20, further comprising:
wirelessly receiving, at the mobile terminal and responsive to the request, at least some of the personal profile information, including the supplemental information;
determining, at the mobile terminal, yardage information relating to yardage of a golf ball of the golfer to a hole on a golf course during the round of golf; and
recommending, by the mobile terminal, a club for use by the golfer based at least on the received personal profile information and the yardage information.

28. The method of claim 20, further comprising:
wirelessly receiving, at the mobile terminal and responsive to the request, at least some of the personal profile information, including the supplemental information; and
recommending, by the mobile terminal, a procedure for playing a hole on a golf course during the round of golf based on the received personal profile information.

29. The method of claim 9, further comprising: video recording a swing of the golfer during at least part of the round of golf.

* * * * *